(12) United States Patent
Hoen, IV et al.

(10) Patent No.: US 9,804,915 B2
(45) Date of Patent: *Oct. 31, 2017

(54) INTEGRATED PRODUCTION SUPPORT

(71) Applicant: BANK OF AMERICA CORPORATION, Charlotte, NC (US)

(72) Inventors: Hudson Philip Hoen, IV, Wilmington, DE (US); Jason N. Alexandrian, Braselton, GA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 90 days.

This patent is subject to a terminal disclaimer.

(21) Appl. No.: 15/056,453

(22) Filed: Feb. 29, 2016

(65) Prior Publication Data

US 2016/0179603 A1 Jun. 23, 2016

Related U.S. Application Data

(63) Continuation of application No. 14/145,974, filed on Jan. 1, 2014, now Pat. No. 9,331,917.

(51) Int. Cl.
| | |
|---|---|
| G06F 11/07 | (2006.01) |
| H04L 12/26 | (2006.01) |
| G06Q 10/04 | (2012.01) |
| G06Q 10/08 | (2012.01) |
| H04L 12/24 | (2006.01) |
| G06F 11/34 | (2006.01) |
| G06F 11/30 | (2006.01) |

(52) U.S. Cl.
CPC ........ *G06F 11/079* (2013.01); *G06F 11/0721* (2013.01); *G06F 11/302* (2013.01); *G06F 11/3065* (2013.01); *G06F 11/3476* (2013.01); *G06F 11/3495* (2013.01); *G06Q 10/04* (2013.01); *G06Q 10/08* (2013.01); *H04L 41/069* (2013.01); *H04L 41/0645* (2013.01); *H04L 43/04* (2013.01); *H04L 43/50* (2013.01); *G06F 11/3006* (2013.01); *G06F 11/3072* (2013.01); *G06F 11/3089* (2013.01)

(58) Field of Classification Search
USPC ............................................ 714/45; 717/128
See application file for complete search history.

(56) References Cited

U.S. PATENT DOCUMENTS

| | | | | |
|---|---|---|---|---|
| 5,926,176 A | * | 7/1999 | McMillan | ............. G06F 11/323 714/E11.181 |
| 6,813,731 B2 | * | 11/2004 | Zahavi | ................ G06F 11/3034 714/45 |

(Continued)

*Primary Examiner* — Kamini Patel
(74) *Attorney, Agent, or Firm* — Michael A. Springs; Moore & Van Allen PLLC; W. Kevin Ransom (57) ABSTRACT

Embodiments for integrating production support features are included in systems for receiving modules from a client application associated with an operator device. The embodiments include selecting at least one client module from the received modules, identifying a trace objective for the at least one client module, selecting a data collection level based on the trace objective, and collecting, by a processor, data associated with the at least one client module in response to the selected data collection level. The systems are combinable with additional production support features including event monitoring.

12 Claims, 9 Drawing Sheets

(56) References Cited

U.S. PATENT DOCUMENTS

| | | | | |
|---|---|---|---|---|
| 7,043,668 | B1* | 5/2006 | Treue | G06F 11/3636 |
| | | | | 712/227 |
| 7,080,289 | B2* | 7/2006 | Swaine | G06F 11/348 |
| | | | | 712/227 |
| 7,325,169 | B2* | 1/2008 | Swoboda | G06F 11/3636 |
| | | | | 712/227 |
| 7,562,259 | B2* | 7/2009 | Swoboda | G06F 11/3636 |
| | | | | 714/45 |
| 9,003,367 | B2* | 4/2015 | Park | G06F 11/3624 |
| | | | | 717/124 |
| 2002/0035721 | A1* | 3/2002 | Swoboda | G06F 11/3636 |
| | | | | 717/128 |
| 2003/0088854 | A1* | 5/2003 | Wygodny | G06F 11/3636 |
| | | | | 717/130 |
| 2013/0054680 | A1* | 2/2013 | Nakano | G06F 11/3495 |
| | | | | 709/203 |
| 2015/0188795 | A1* | 7/2015 | Hoen, IV | G06F 11/3006 |
| | | | | 709/224 |

\* cited by examiner

TRACE MESSAGES

| | EVENT TYPE | SOURCE | DATE | MESSAGE |
|---|---|---|---|---|
| | INFORMATION | INFRASTRUCTURE | 2013/05/30 09:25:19 | CREATING ISOLATED STORAGE DIRECTORY \ICS |
| | INFORMATION | CARDPAYMENTSYSTEMMODULE | 2013/05/30 09:25:05 | READING REGISTRY FOR ACCOUNT NUMBER |
| | INFORMATION | CARDPAYMENTSYSTEMMODULE | 2013/05/30 09:25:05 | (psAppACTIVATEDEVENTHANDLER EXECUTING |
| | INFORMATION | CARDPAYMENTSYSTEMMODULE | 2013/05/30 09:25:05 | ...CARDPAYMENTSYSTEMMODULE.INITIALIZE() ENDS... |
| | INFORMATION | CARDPAYMENTSYSTEMMODULE | 2013/05/30 09:25:05 | PUBLISHED (psAppACTIVATEDEVENT |
| | INFORMATION | CARDPAYMENTSYSTEMMODULE | 2013/05/30 09:25:05 | SUBSCRIBE TO (psAppACTIVATEDEVENT |
| | INFORMATION | CARDPAYMENTSYSTEMMODULE | 2013/05/30 09:25:03 | ONIMPORTSSATISFIED - SUCCESSFUL |
| | INFORMATION | CARDPAYMENTSYSTEMMODULE | 2013/05/30 09:25:03 | ...CARDPAYMENTSYSTEMMODULE.INITIALIZE() BEGINS... |
| | INFORMATION | CARDPAYMENTSYSTEMMODULE | 2013/05/30 09:25:03 | MAINWINDOW ACTIVATE |

INTEGRATED PRODUCTION SUPPORT

CROSS-REFERENCE TO RELATED APPLICATIONS

The present application is a continuation application of U.S. non-provisional patent application Ser. No. 14/145,974, filed Jan. 1, 2014 of the same title; the content of which is also incorporated herein by reference in its entirety.

BACKGROUND

Computing systems often require vast amounts of data be logged in order to detect issues, provide solutions, and test production features. This is usually a time consuming process that requires writing logging code for capturing the data. Further, the logged data may not be provided to analysts in real time and is often disorganized and unfiltered resulting in inefficient and ineffective analysis.

BRIEF SUMMARY

The embodiments provided herein are directed to systems for integrating production support. In some embodiments, the systems include a computer apparatus including a processor and a memory and a production support module stored in the memory, comprising executable instructions that when executed by the processor cause the processor to receive modules from a client application associated with an operator device in communication with the system. In some embodiments, the executable instructions further cause the processor to select at least one client module from the received modules. In some embodiments, the executable instructions further cause the processor to identify a trace objective for the at least one client module. In some embodiments, the executable instructions further cause the processor to select a data collection level based on the trace objective. In some embodiments, the executable instructions further cause the processor to collect data associated with the at least one client module in response to the selected data collection level.

In other embodiments of the systems, the executable instructions further cause the processor to select a data output rule; and provide the collected data to a user in accordance with the data output rule. In still other embodiments, the executable instructions further cause the processor to transmit a mirror display of the operator device to a device of the user in accordance with a first output rule; transmit the collected data to a logging server that is in communication with the system for storage of the collected data in accordance with a second output rule; or transmit the collected data to the device of the user in real time in accordance with a third output rule. In additional embodiments, the executable instructions further cause the processor to allow the user to identify, test, or correct elements of the at least one module based on the collected data. In some embodiments, the executable instructions further cause the processor to select a first data collection level; detect a first portion of the data associated with the at least one client module based on the first data collection level; and provide only the first portion of the data to a user.

In further embodiments, the executable instructions further cause the processor to select a second data collection level; detect a first portion and a second portion of the data associated with the at least one client module based on the second data collection level; and provide the first portion and the second portion of the data to the user. In some embodiments, the first portion of the data comprises critical data and the second portion comprises the critical data and additional data comprising at least one of error data, warning data, informational data, detailed data, and activity tracing data. In other embodiments, the executable instructions further cause the processor to identify code comprising trace recording elements; transmit the identified code to the client application to enable trace message recording; receive trace messages from the client application; and transmit the trace messages to the user.

In some embodiments, the executable instructions further cause the processor to receive event data transmitted from the client application; provide the event data to the user; allow the user to analyze or detect issues associated with the client application based on the event data. In other embodiments, the at least one module is selected based on the event data. In additional embodiments, the collected data comprises a time stamp of an action performed by the at least one module and a description of the action.

Further provided herein are embodiments directed to a computer program product for integrating production support. In some embodiments, the computer program product comprises a computer readable storage medium having computer readable program code embodied therewith, the computer readable program code comprising computer readable program code configured to receive modules from a client application associated with an operator. In some embodiments, the computer program product further includes computer readable program code configured to select at least one client module from the received modules. In some embodiments, the computer program product further includes computer readable program code configured to identify a trace objective for the at least one client module. In some embodiments, the computer program product further includes computer readable program code configured to select a data collection level based on the trace objective. In some embodiments, the computer program product further includes computer readable program code configured to collect data associated with the at least one client module in response to the selected data collection level.

In further embodiments, the computer program product further includes computer readable program code configured to select a data output rule and provide the collected data to a user in accordance with the data output rule. In other embodiments, the computer program product further includes computer readable program code configured to transmit a mirror display of the operator device to a device of the user in accordance with a first output rule, transmit the collected data to a logging server for storage of the collected data in accordance with a second output rule, or transmit the collected data to the device of the user in real time in accordance with a third output rule. In still other embodiments, the computer program product further includes computer readable program code configured to select a second data collection level, detect a first portion and a second portion of the data associated with the at least one client module based on the second data collection level, and provide the first portion and the second portion of the data to the user. In additional embodiments, the first portion of the data comprises critical data and the second portion comprises the critical data and additional data comprising at least one of error data, warning data, informational data, detailed data, and activity tracing data.

In additional embodiments, a computer-implemented method for integration production support is provided. In some embodiments, the method includes receiving modules from a client application associated with an operator device.

In some embodiments, the method includes selecting at least one client module from the received modules. In some embodiments, the method includes identifying a trace objective for the at least one client module. In some embodiments, the method includes selecting a data collection level based on the trace objective. In some embodiments, the method includes collecting, by a processor, data associated with the at least one client module in response to the selected data collection level.

In further embodiments, the method includes selecting a data output rule; and providing, by a processor, the collected data to a user in accordance with the data output rule. In some embodiments, the method includes transmitting, by a processor, a mirror display of the operator device to a device of the user in accordance with a first output rule; transmitting, by a processor, the collected data to a logging server that is in communication with the system for storage of the collected data in accordance with a second output rule; or transmitting, by a processor, the collected data to the device of the user in real time in accordance with a third output rule. In some embodiments, the method includes selecting a first data collection level; detecting, by a processor, a first portion of the data associated with the at least one client module based on the first data collection level; and providing, by a processor, only the first portion of the data to a user, where the first portion comprises at least one of critical data, error data, warning data, informational data, detailed data, and activity tracing data.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 6 is an illustration of a graphical user interface for providing integrated production support via event monitoring in accordance with various embodiments;

FIG. 8 is an illustration of a graphical user interface for providing integrated production support via menu button monitoring in accordance with various embodiments.

DETAILED DESCRIPTION

The embodiments presented herein are directed to systems, methods, and computer program products for providing enhanced integrated production support. Specific integrated production support features include trace features, event monitoring, SOAP message monitoring, menu button monitoring, and endwork context viewing. The various production support features provide adjustable levels of tracing and real time monitoring that accelerates issue spotting, prevents server crashes, increases storage capacities, and generally enhances production and support of the systems described herein.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
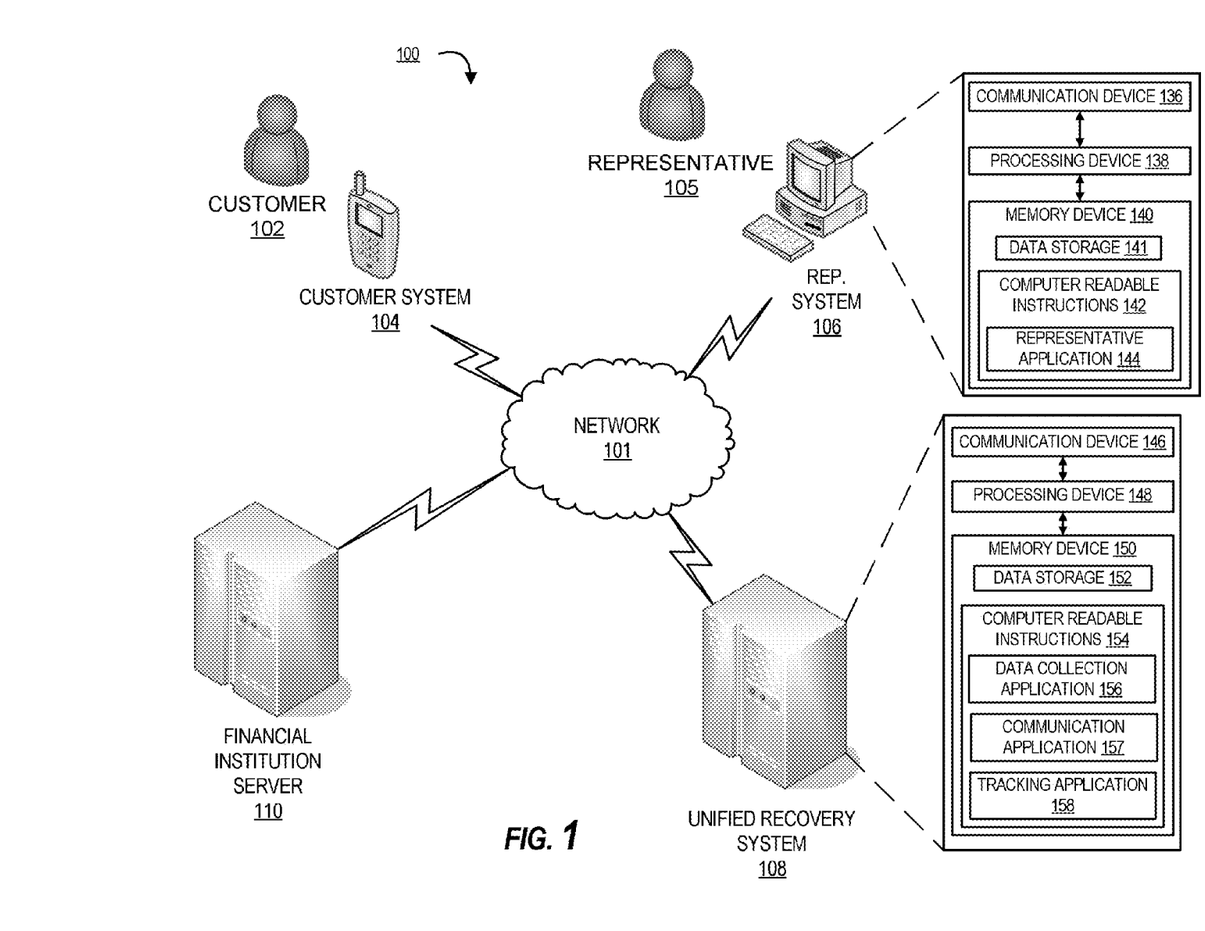
FIG. 1 provides a block diagram illustrating a system and environment for integrating production support.

FIG. 1 provides a unified recovery system environment 100, in accordance with embodiments of the present invention. As illustrated in FIG. 1, the unified recover system 108 is operatively coupled, via a network 101 to the customer system 104, to the representative system 106, and to the financial institution server 110. In this way, the unified recovery system 108 can send information to and receive information from the customer system 104, the representative system 106, and financial institution server 110, to correlate all of the customer's relationships with an entity into one unified recovery system. FIG. 1 illustrates only one example of an embodiment of a unified recovery system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the customer 102 is an individual who has products with the entity. These products may be one or more contracts, accounts, loans, transactions, agreements, or the like. As such, the customer 102 may have one or more products with payments in arrears. In some embodiments, the customer 102 may be a merchant or a person, employee, agent, independent contractor, and the like acting on behalf of the merchant that may have one or more products with payments in arrears with the entity.

As illustrated in FIG. 1, a unified recovery system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to a representative system 106, a customer system 104, and a financial institution server 110. As such, the communication device 146 generally comprises a modem, server, or other device for communicating with other devices on a network 101.

As further illustrated in FIG. 1, the unified recovery system 108 comprises computer-readable instructions 154 stored in the memory device 150, which in one embodiment includes the computer-readable instructions 154 of a data collection application 156. In some embodiments, the computer-readable instructions 154 include a communication application 157. In some embodiments, the computer-readable instructions 154 include a tracking application 158. In still further embodiments, the computer-readable instructions 154 include a production support application (not shown). In some embodiments, the memory device 150 includes data storage 152 for storing data related to unified recovery system including but not limited to data created and/or used by the data collection application 156, communication application 157, and/or tracking application 158.

In the embodiment illustrated in FIG. 1, the data collection application 156 may collect and compile recover programs utilized across the entity, customer relationship data across an entity, and to generate a centralized location for customer data. In some embodiments, the data collection application 156 may collect and compile recovery products utilized across the entity into a single centralized unified recovery system 108. These may be collected from entity representative systems 106, the financial institution server 110, and/or other systems. These recover products may be internal or external dockets, ledgers, software, systems, or the like that are designed to initiate, monitor, and record any communication or payment associated with customer 102 products in arrears. In further embodiments, the data collection application 156 may collect and compile customer relationship data. In this way, the data collection application 156 may compile all information that an entity may have associated with a customer 102. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity. In other embodiments, the data collection application 156 may merge the recovery programs and the customer relationship data together into the unified recovery system 108. This data may be stored grouped by on the customer 102, customer identification number, account number, or telephone number. In this way, the system may generate a single centralized location for customer relationships for a representative to view and interact with. As such, any different recovery products and customer relationship data may be integrated into the one centralized unified recovery system.

In the embodiment illustrated in FIG. 1 the unified recovery system 108 further comprises a communication application 157. The communication application 157 allows for presentment of data to the representative, for rules determination and presentment, determines lead accounts, and for communication via a network 101 with the customer 102. In some embodiments, the communication application 157 allows for presentment of data to the representative. This data may be customer 102 information, prior communications, communication dispositions, current accounts, accounts in arrears, lead accounts, and the like. In this way, the representative may have information associated with all customer relationships within the entity easily accessible for his/her communication with the customer 102. In some embodiments, the communication application 157 allows for incorporation of a rules engine into the information provided to the representative. In some embodiments, the rules associated with the rules engine may be manually inputted by a representative. In some embodiments, the rules associated with the rules engine may be automatically inputted. In some embodiments, the rules may be based on entity requirements or preferences. In some embodiments, the rules may be based on customer preferences. In yet other embodiments, the rules may be based on legal requirements or restrictions. These rules may be communicated to the representative system 106 for the representative 105 from the communication application 157 via the network 101. In this way, the representative 105 may be aware of the rules for customer 102 communications.

Along with the rules, the communication application 157 may also determine a lead account associated with the customer 102, identify an appropriate representative 106, warn or prohibit communications to a customer 102, or require disposition input after a communication. Determining a lead account requires the communication application 157 to communicate with the financial institution server 110 to select an account in arrears that is most important for the entity to recover. Selecting an appropriate representative may be achieved by the communication application 157 based on which representative has experience with that particular customer, knowledge with that particular lead account, or general expertise regarding a field associated with the lead account. The communication application 157 may communicate warning or prohibiting communications to a customer 102 via the network 101 to a representative system 106.

In some embodiments, the communication application 157 may allow for representative 105 communications with the customer 102 via the network 101. In this way, the communication application 157 allows for the communication, limits the communication, and/or doesn't allow any communication based on the rules determined. In the embodiment illustrated in FIG. 1, the unified recovery system 108 further comprises a tracking application 158. The tracking application 158 tracks the communications of customer 102. As such, dates, times, outcomes, responses, dispositions, or the like associated with each and every attempt to contact the customer 102. In this way, the system may track whether a communication went through to the customer, whom the representative spoke to, the duration of the communication, time of communication, date of communication, or the like. In other embodiments, the production support application traces data by module or individual, monitors events performed by a client, monitors SOAP messages, monitors menu buttons of a client, provides endwork data, and contributes to the integration of production support as provided herein.

As illustrated in FIG. 1, a representative 105 may be an individual customer service representative for an entity, an operator, and the like. In some embodiments the representative 105 may be an individual employed by the entity. In some embodiments, the representative 105 may be an outside contractor for the entity. The representative 105 may have unique skills or experience with recovery payments in arrears for various products associated with products provided by the entity.

As illustrated in FIG. 1, the representative system 106 generally comprises a communication device 136, a processing device 138, and a memory device 140. The processing device 138 is operatively coupled to the communication device 136 and the memory device 140. In some embodiments, the processing device 138 may send or receive data from the customer system 104, financial institution server 110, and/or the unified recover system 108 via the communication device 136 over a network 101. As such, the communication device 136 generally comprises a modem, server, or other device for communicating with other devices on the network 101.

As further illustrated in FIG. 1, the representative system 106 comprises computer-readable instructions 142 stored in the memory device 140, which in one embodiment includes the computer-readable instructions 142 of a representative application 144. In the embodiment illustrated in FIG. 1, the representative application 144 allows the representative system 106 to be linked to the unified recovery system 108 to communicate, via a network 101, the information related to the communications with a customer 102 related to products with payments in arrears. In some embodiments, the communication from the representative 105, such as communication inputted on the unified application by the representative 105, may be communicated to the unified recover system 108 via the communication device 136. The representative application 144 may also allow the representative to receive data, such as the unified application including customer relationships, or the like, in order to communicate with the customer. The memory device 140 further includes a data storage 141.

FIG. 1 also illustrates a customer system 104. The customer system 104 generally comprises systems with devices the same or similar to the devices described for the unified recovery system 108, and/or the representative system 106 (i.e., communication device, processing device, and memory device). Therefore, the customer system 104 may communicate with the unified recovery system 108, the representative system 106, and/or the financial institution server 110 in the same or similar way as previously described with respect to each system. The customer system 104, in some embodiments, is comprised of systems and devices that allow the customer 102 to communicate with the representative 105 over a network 101. The customer system 104 may be, for example, a home phone, a desktop personal computer, a mobile system, such as a cellular phone, smart phone, personal data assistant (PDA), laptop, or the like. Although only a single customer system 104 is depicted in FIG. 1, the unified recovery system environment 100 may contain numerous customer systems 104.

The financial institution server 110 is operatively coupled to the unified recovery system 108, the representative system 106, and/or the customer system 104 through the network 101. The financial institution server 110 has systems with devices the same or similar to the devices described for the unified recovery system 108 and the representative system 106 (i.e., communication device, processing device, and memory device). Therefore, the financial institution server 110 communicate with the unified recovery system 108, the representative system 106, and/or the customer system 104 in the same or similar way as previously described with respect to each system. The financial institution server 110, in some embodiments, is comprised of systems and devices that allow the unified recover system 108, the representative system 106, and the customer system 104 access to one or more accounts associated with the customer 102 with the financial institution.

It is understood that the servers, systems, and devices described herein illustrate one embodiment of the invention. It is further understood that one or more of the servers, systems, and devices can be combined in other embodiments and still function in the same or similar way as the embodiments described herein.

Trace Feature

Tracing information such as the action of opening up an account or the amount of time it took to complete an action can be used in production, testing, issue spotting, and corrections. Tracing can be conducted by module, by code, or by individual. The embodiments presented herein include configuring traces for a wide variety and levels of data. Simply logging events that are important or that are errors takes large amounts of storage, time, and resources, and may not provide enough details for production and testing. By inspecting all types and levels of data including data unrelated to errors, a more detailed and expanded view of the system can be provided. Moreover, the trace embodiments can be used to modify a particular module, user role, or combination, to enable data output from a particular module to various databases, files, and devices of the system (e.g., the unified recovery system 108 of FIG. 1).

Figure 2:
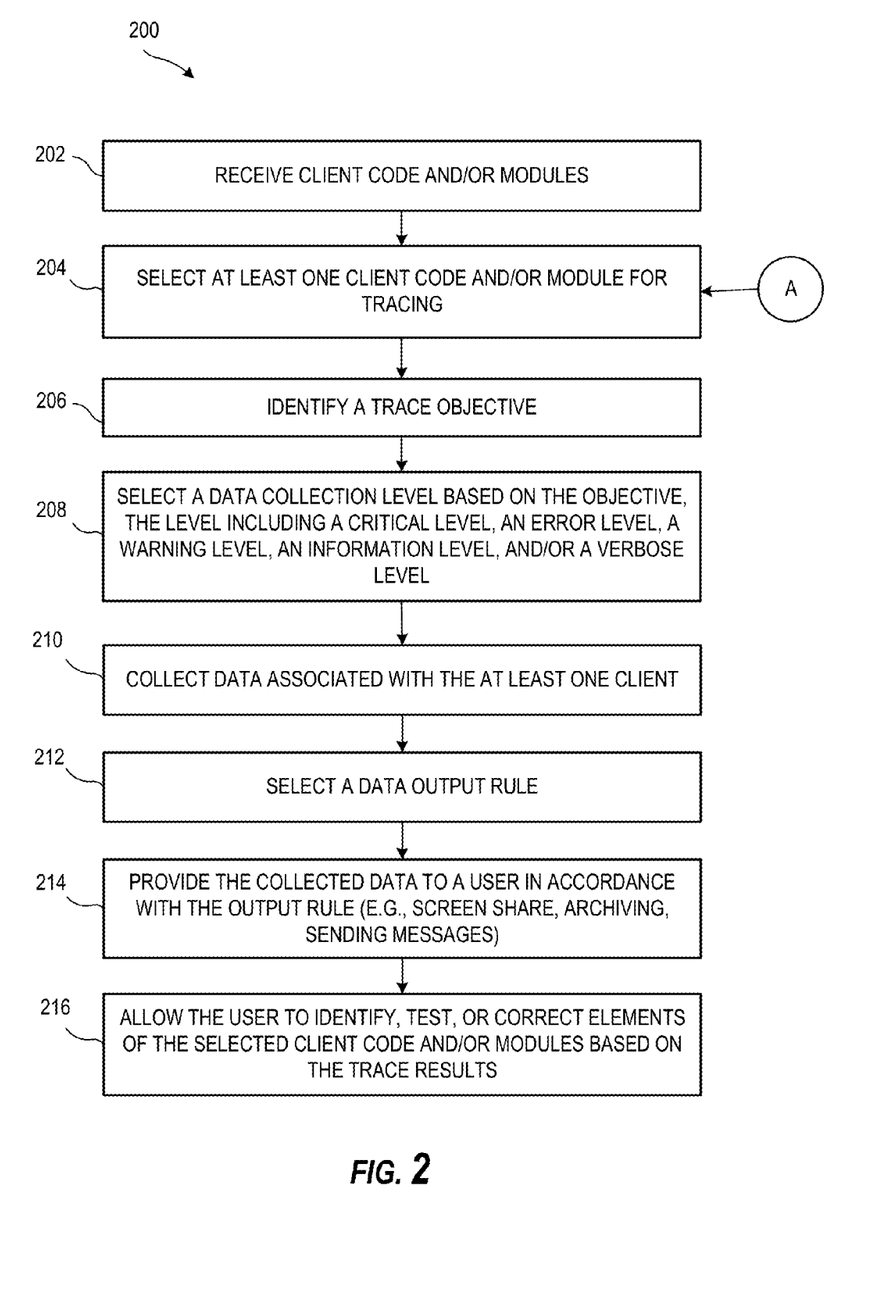
FIG. 2 is a flowchart illustrating a system and method for providing integrated production support in accordance with various embodiments.

FIG. 2 illustrates a flowchart providing an overview of a process 200 for providing integrated production support by configuring traces and providing trace messages. One or more devices, such as the one or more devices and/or one or more other computing devices and/or servers of FIG. 1, can be configured to perform one or more steps of the process 200 or 500 described below and other processes described herein. In some embodiments, the one or more devices performing the steps of the processes are associated with a financial institution. In other embodiments, the one or more devices performing the steps of the processes are associated with a merchant, business, partner, third party, credit agency, account holder, and/or user. As provided herein, it will be understood that the process of FIG. 2 is merely an exemplary embodiment and that the various steps of process 200 can be conducted in any order.

As illustrated at block 202, client code and/or modules are received. In some embodiments, the code and/or modules are received from a client or other application stored on or otherwise associated with a device of an operator, representative, employee, and the like (e.g., the representative 105 in FIG. 1). In additional embodiments, the client comprises a roles based client. In a roles based environment, code and modules that are specifically related to a role or job function of the operator are injected into an application shell to build the client such that when the operator logs into the operator's workstation, the operator is provided with a customized, roles based client. The client code and/or client modules, in some embodiments, are associated with a client, an individual, a role, or combinations thereof.

As illustrated at block 204, at least one client module (or client code) is selected for tracing. In some embodiments, the at least one client module is selected based on operator input, error detections, monitoring activities, and the like. For example, if an operator reports a problem with a client feature (e.g., a frozen screen) or the client reports a detected malfunction, the module associated with the reported issue may be selected. In other cases, the client code and/or module may be selected based on other production support features such as event monitoring as detailed below.

Figure 3:
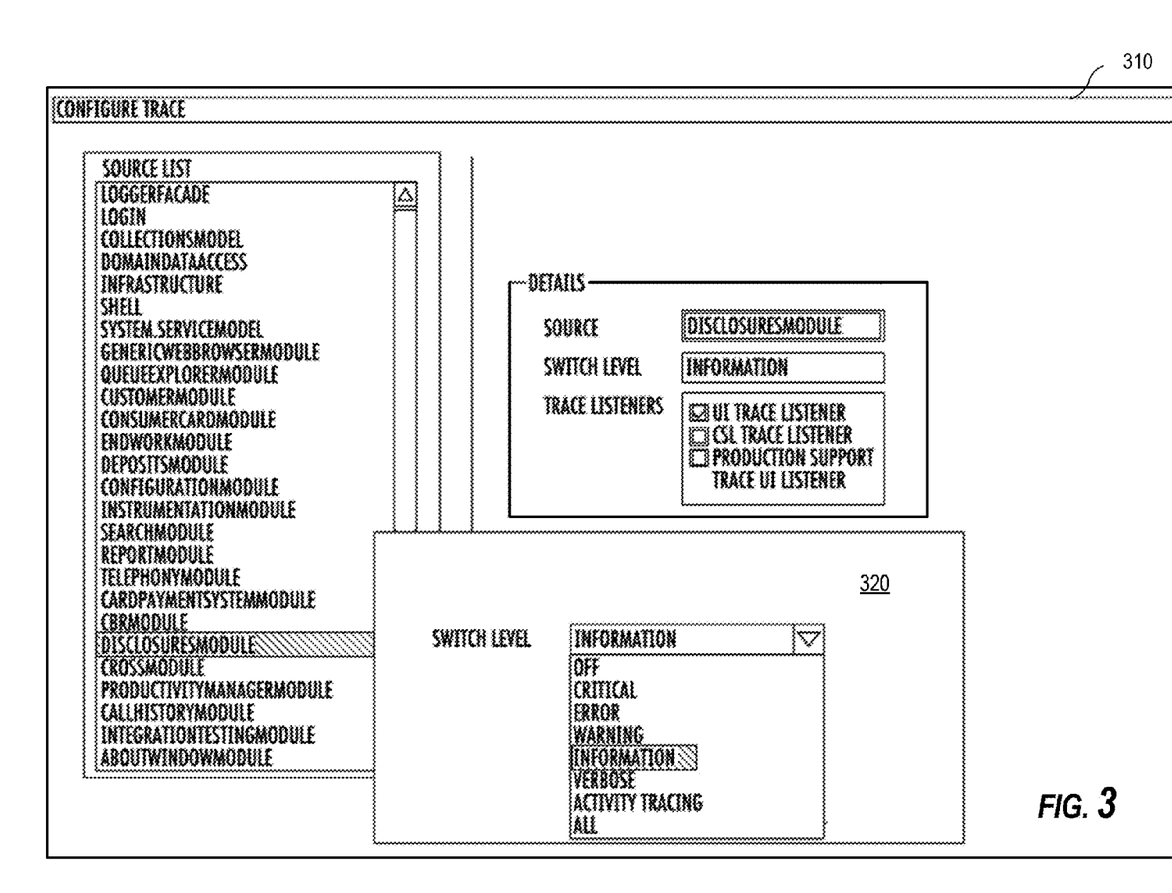
FIG. 3 is an illustration of a graphical user interface for providing integrated production support via trace configuration in accordance with various embodiments.

FIG. 3 illustrates a graphical user interface (GUI) 310 of the system of process 200 that includes a source list on the left hand side of the GUI 310. The source list includes base codes and modules that are capable of being traced such as modules for reporting, searches, deposits, consumer cards, call history, and so forth. In the illustrated embodiment, a disclosures module is selected.

Returning now to FIG. 2 and as illustrated at block 206, a trace objective is identified. The trace objective includes reasons of varying scopes for tracing the selected module such as product development, issue spotting, testing, issue prevention, correction, and the like. Exemplary trace objectives include overloading system features (e.g., increasing the amount of data being processed, increasing the number of tasks being performed, and the like) detecting trends, identifying strengths and weaknesses in the system or client, sequencing events, measuring upload times, measuring download times, measuring operator task completion times, measuring bandwidth usage, measuring data processing times, generating updates, updating existing clients, developing new clients, modifying specific modules, and the like. In some embodiments, the at least one client module is selected based on the trace objective.

In some embodiments, the trace objective is identified based on operator input and/or automated processes. For example, the trace objective may be based on input transmitted manually by a representative or operator using a remote device. The input may include an identified issue or provide a suggestion for improvement such as adding new functionality to a cost calculator. In some cases, automated reporting and operator input may overlap to provide a more complete report. The operator may know that the system has slowed down in response times and may report the slowdown, but the automated reporting may provide the reasons for the slow response times such as detected errors or specific system failures. In still other examples, new hires, new training modules, changes in law, account policy changes, or customer account changes may be used to determine that new versions of the client are needed.

As illustrated at block 208, a data collection level is selected based on the trace objective. The level of detail needed for tracing can vary based on the trace objective, the deadlines associated with the objective, and the resources available to accomplish the objective. For example, identifying and fixing a current problem may only require a limited level of data and may be done quickly while preventing future issues may require a greater level of data and may take a long time to accomplish. In another example, some product development projects such as a major system overhaul or development of a new product may require a large amount of details, a large team of developers, plenty of storage space, and a large quantity of bandwidth user, while other projects such as an uncomplicated upgrade to an existing client may require less data and resources.

In some embodiments, the data collection level includes a critical level for detecting and collecting critical data, an error level for detecting and collecting error data, a warning level for detecting and collecting warning data, an information level for detecting and collecting informational data, a verbose level for detecting and collecting very detailed data, and an activity tracing level for detecting and collecting activity data. Exemplary critical data includes code necessary for the module to function. Error data includes, for example, critical data, bugs, malfunctions, detected errors, reported errors, and the like. Informational data includes, in some embodiments, at least one of the critical data, the error data, the warning data, and additional data such as high level action descriptions, event types, module sources, and so forth. The detailed data in the verbose level includes, for example, at least one of the critical data, the error data, the warning error, the information level, and other data such as lines of code.

Returning to FIG. 3, a pop-up window 320 of switch levels corresponding to the data collection levels noted above is illustrated. A user may select a particular switch level or choose to leave the switch level off. The switch levels are stack based, i.e., include data from all previous levels in the list. For example, the selected information level is used to detect and collect the data of the critical level, the data of the error level, the data of the warning level, and the data of the information level, but does not include the data of the verbose level and the activity tracing level.

As illustrated at block 210 in FIG. 2, data associated with at least one client is collected. In some embodiments, code or modules directed to recording the data is built into the client such that the data can be traced with the amount of details required for each data collection level. For example, when an operator logs into a remote device, the system of process 200 may inject specific code for collecting data at the various levels into a client shell such that when the client is deployed, data collection can be implemented.

As illustrated at block 212, a data output rule is selected. In some embodiments, a trace recorder is provided that includes data output rules that determines how data is stored. For example, FIG. 3 includes trace listeners that are configured to collect and store data. The Unit Interval Trace Listener is configured to store trace messages via screen share technology such that the screen of a remote device is mirrored on the user's screen. Further shown in GUI 310 of FIG. 3 is a CSL Trace Listener that is configured to send data to a logging server to store the collected data in a database. Moreover, a Productions Support UI Trace Listener is also provided and is configured to collect data from a remote device and transmit the collected data to the user's device (e.g., a device of an analyst or production support member) in real time.

Figure 4:
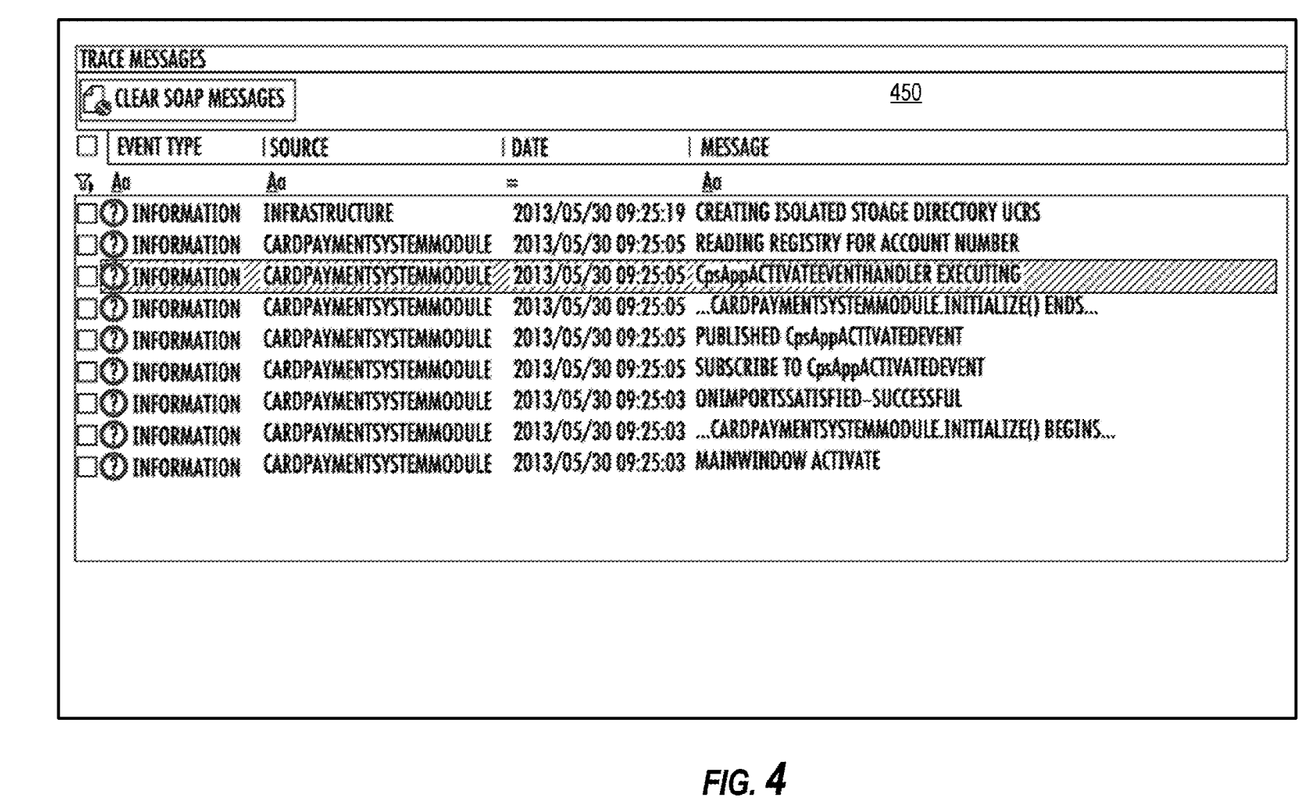
FIG. 4 is an illustration of a graphical user interface for providing integrated production support via trace messaging in accordance with various embodiments.

As illustrated at block 214, the collected data is provided to a user in accordance with the output rule. As noted above, the data is provided via a mirrored screen, archived (i.e., transmitted to a database), and/or transmitted to the user's device in real time in accordance with the rules associated with the trace listeners. The user includes users of the system of process 200 such as production support personnel and the like. FIG. 4 illustrates a screen 450 of a user's device mirrored from a remote device that includes data collected via the CLS Trace Listener and in accordance with the selected Information level. In the illustrated embodiment, the event types, the source code and modules, the date and time of the events, and messages describing various events are provided. The source identified as "Infrastructure" creates an external storage directory for storing the collected data. The events initiated via the card payment system module in FIG. 4 are described in the message column.

As illustrated at block 216, the user is allowed to identify, test, or correct elements of the selected client code and/or modules based on the trace results. For example, a production support team may use the collected data to accomplish the trace objective.

Events Monitoring

In some systems, modules may not communicate directly with each other due to the way in which clients are built and deployed. For example in roles based systems, only code related to the specific roles of an operator may be streamed to the client upon login resulting in separated client modules that do not communicate with other modules of the system. In such cases, analysis of the system may be based on executed client events, which can become quite difficult and confusing to track. The events monitoring feature described herein provides an efficient and organized process for viewing and tracking client events as they occur.

Figure 5:
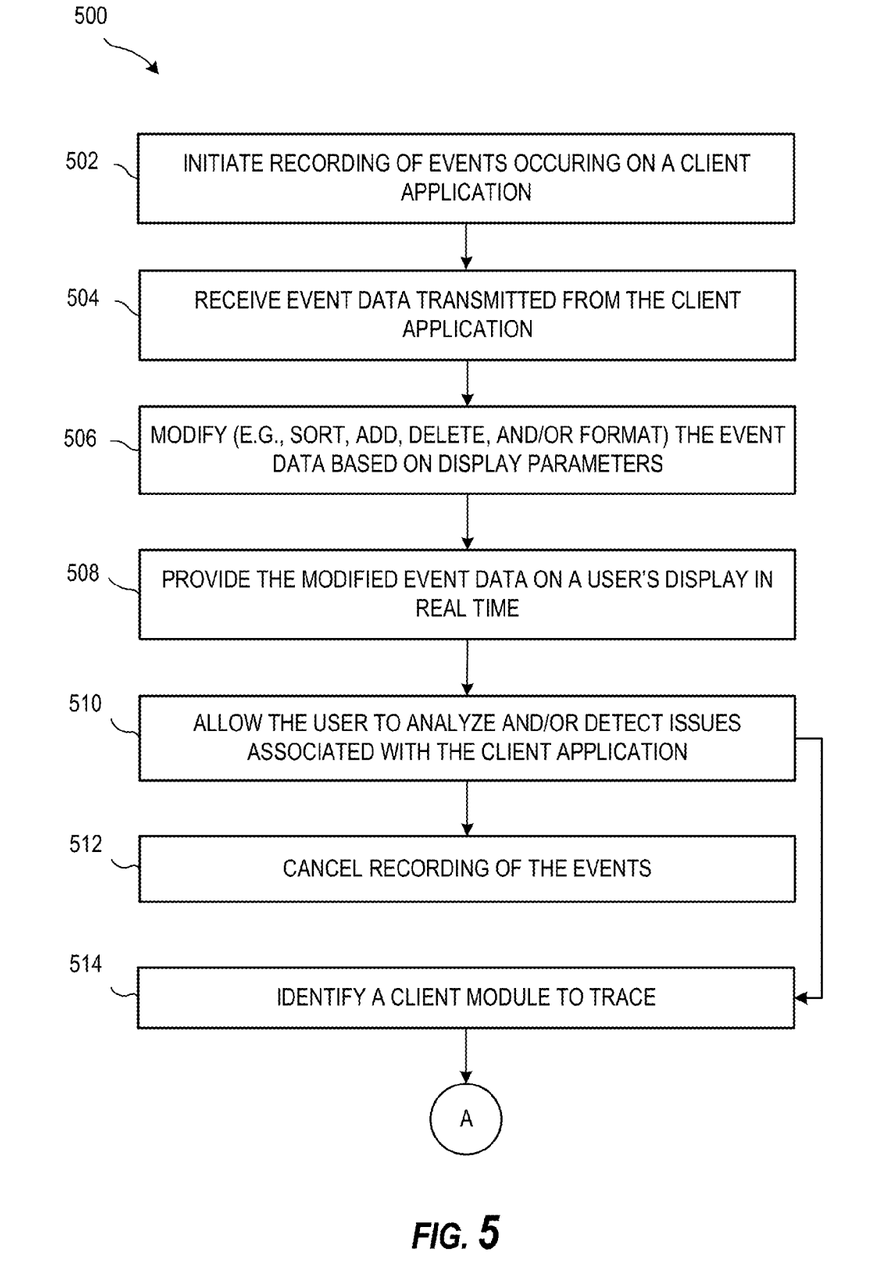
FIG. 5 is a flowchart illustrating a system and method for providing integrated production support in accordance with various embodiments.

Referring now to FIG. 5, a diagram illustrating a process 500 for providing integrated production support via even monitoring is provided. It will be understood that the process of FIG. 5 is merely an exemplary embodiment and that the various steps of process 500 can be conducted in any order.

As illustrated at block 502, recording of events occurring on a client application is initiated. In some embodiments, an operator of a remote device initiates the recording of events of the client on the remote device. A recording module on the client can be used to automatically or manually initiate the recording of events. The events include actions performed by code and/or modules of the client application and/or user of the client application. Exemplary events include opening windows, requesting data, logging events, updating procedures, opening tools, archiving, and so forth. In some embodiments, the events include one or more service calls. For example, SOAP message monitoring can be used to monitor all service calls associated with a particular role, client, and/or operator.

As illustrated at block 504, event data transmitted from the client application is received. In some embodiments, the event data is stored locally on the remote device, transmitted to a logging server for storage, screen shared with another device, and so forth. The event data includes the code or module source of the event, a description of the event, the method by which the event is carried out, time of the event, date of the event, operator data, remote device data (e.g., IP address), role data (e.g., job title, job function, or group membership), SOAP data, and the like.

As illustrated at block 506, the event data is modified based on display parameters. For example, the event data may be sorted (e.g., categorized and/or prioritized) and formatted, and also data may be added and/or deleted from the event data based on the display parameters. Exemplary display parameters include event types, dates, times, fields, modules, display options, and so forth. All events associated with the client can be presented chronologically, grouped by module source, prioritized such that the most critical data is presented first, color coded according to categorization rules, and so forth. Certain event data such as module or event descriptors may be shortened, replaced by acronyms, or resized for presentation.

As illustrated at block 508, the modified event data is provided on a user's display in real time. In some embodiments, the display of the remote device is screen shared or mirrored such that the user can view the modified event data on a mirrored display provided on the user's device in real time. In some cases, the user may take over operations at the remote device via screen sharing or the user may simply observe events occurring on the remote device via the mirrored display. In other embodiments, the modified event data is transmitted (e.g., streamed) to the user's device from the remote device. The mirrored display data may be the same as or different from the transmitted data. For example, the transmitted data may only include event messaging or summaries of events as they occur, and thus may be in a different format or have less detail than the event data provided on the mirrored display. In additional embodiments, the modified event date or the received event data is stored in a database. In such cases, the event data may be stored locally on the remote device, stored locally on the user's device, or stored remotely.

An illustrated embodiment of the display of the modified event data is provided in FIG. 6. A GUI 600 of an events dashboard is illustrated and includes a split screen comprising four separate portions. In a first portion 610, an event execution summary is provided that includes the method of performing the event, the target name, which describes the action performed, and the number of executions. More details of the event execution are provided in a second portion 620. In the illustrated embodiment, the event execution is related to a card payment system and the event includes the presentation of view models. The time the event occurs, the event type, the event name, the method, and the thread type are included in the second portion 620. In the illustrated embodiment, the method used to perform events includes active panel changes and SOAP (Simple Object Access Protocol) message tracing.

A third portion 630 of the GUI 600 in FIG. 6 includes event firings such as the number of subscription events that occur during a time period, the number of publish events that occur during the time period, and the number of executing handlers that occur during the time period. A fourth portion 640 provides additional details for the selected event in the second portion 620, i.e., the event that occurs at 09:55:37. The additional details in the fourth portion 640 include the full target description associated with the executed event, the module name used to perform the event, and the location of the module. If the selected event were related to dialing campaigns, the identity of a calling class (e.g., a calling queue for credit card accounts) would be included as well as the calling method (e.g., a virtual dialer, manual dialer, automatic dialer, or combinations thereof).

In other examples, the display may include SOAP message data. The SOAP message data may be conveyed via the mirrored display operations described above, or the SOAP message data may not include a mirrored display. For example, the client may send SOAP message data to the user's device via SOAP-related protocols such that the SOAP message data is provided on the display of the user's device. Such SOAP message data may be displayed in various configurations as described herein below with reference to FIG. 7.

Returning to FIG. 5 and as illustrated at block 510, the user is allowed to analyze and/or detect issues associated with the client application. For example, the user may use the data to develop new products or upgrades to an existing client and other applications to improve performance and implement changes. The user may overload or otherwise subject certain system features to rigorous demands in order to trigger a failure, determine an order of events that increases or decreases performance, measure the amount of time needed to complete an action (e.g., response times, upload times, download times), measure bandwidth use, and the like. In other embodiments, the testing, calculations, and analysis are done automatically by the system of process 500.

As illustrated at block 512, the recording of the events is cancelled. In some events, the recording is cancelled automatically or in response to user input. For example, the recording may be automatically cancelled upon correction of a reported error or after a certain period of time. In other examples, the user may have partial or complete control over the recording. For example, the user may override automatic cancellations or select recording options that best suit the user's needs.

As illustrated at block 514, a client module may be identified for a trace. For example, certain event data or events may point to particular modules that need updating or that have detected issues. It may be necessary, in some cases, to look at more details related to the module performing certain events in order to correct or spot an issue, improve performance, or change event sequencing. Details of the trace process are described above with regard to FIG. 2 and FIGS. 3-4.

In addition to module tracing and event monitoring described hereinabove, the embodiments further include various other features for enhancing and integrating production support as detailed below with regards for FIGS. 7-9.

SOAP Message Monitoring

SOAP message monitoring provides a real time grid of every service call associated with a particular client. In this way, the client can be monitored in real time without having to retrieve logs, which reduces the resources required to keep track of the functioning of the client. SOAP message monitoring is yet another tool available to systems or users that can be used alone or with other product support features presented herein for testing, issue spotting, error correction, product development, and other production support processes.

Figure 7:
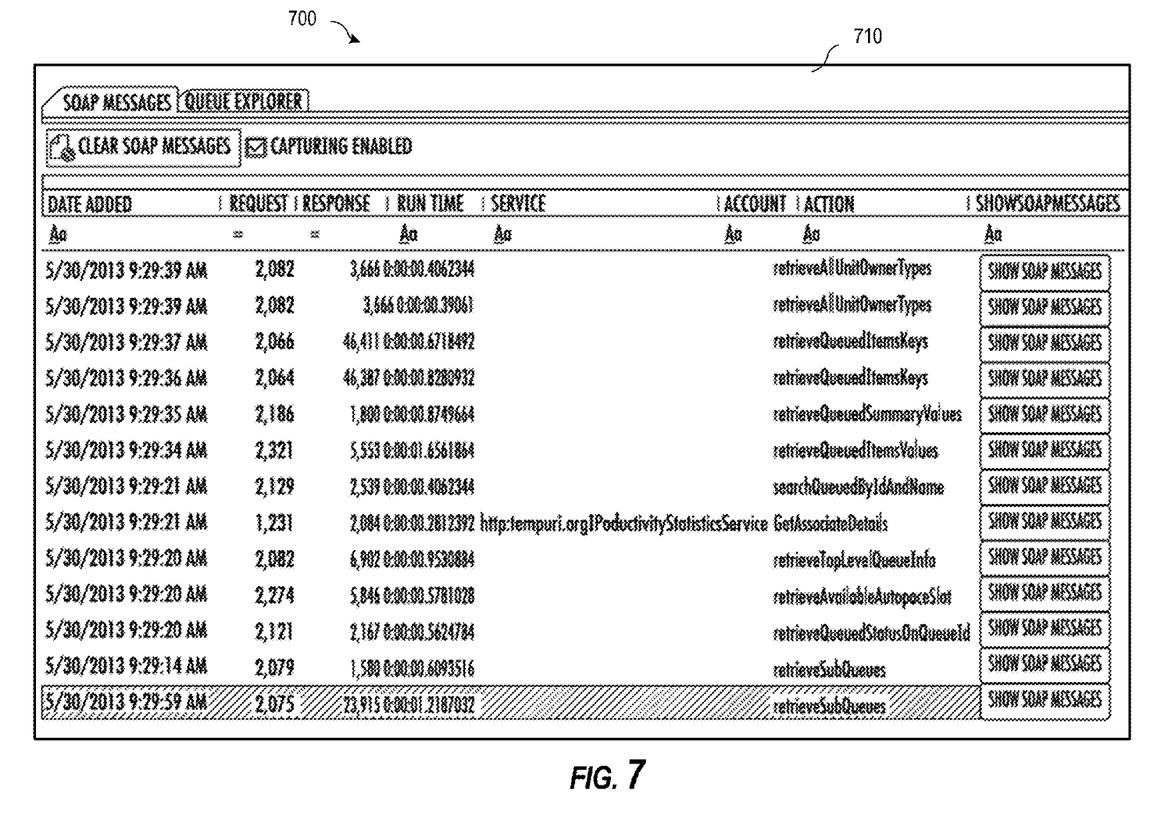
FIG. 7 is an illustration of a graphical user interface for providing integrated production support via SOAP message monitoring in accordance with various embodiments.

Referring now to FIG. 7, a system 700 for monitoring SOAP (simple object access protocol) messages is illustrated. GUI 710 includes a listing of SOAP messages that include the date and time of the request, the number of items in the service call request, the number of items in the response, run time, service, account, action, and button for showing a particular SOAP message. The action column includes descriptions of the action associated with the SOAP message related to, for example, retrieving data for unit owner types (e.g., account holders, customers, and the like) and queues. Queues include a list of accounts for a dialing campaign, which may be sorted and filtered in accordance with certain account parameters related to, for example, state law requirements for phone call velocities, time zones, account balances, account types, call histories, call metrics, and the like. A user of the system 700 can click on the show SOAP messages button to retrieve the SOAP message. In some embodiments, the selected SOAP message includes a split screen (not shown) comprising the details of the request in one window pane and the details of the response in the second window pane. The user may copy the request message, the response message, or combination thereof to capture SOAP message details.

Menu Button Monitoring

Menu button monitoring, whether used alone or in combination with the other integrated production support features disclosed herein, allows a user to review menu combinations. Every module in the system is responsible for inserting its own ribbons menus to establish when certain buttons should be visible, invisible, or grayed out. A user can use the menu button monitoring to determine if the modules should be modified to add or delete buttons, change button descriptions, change button linking, and so forth.

FIG. 8 illustrates a GUI 810 of a system 800 for monitoring menu buttons. The GUI 810 includes tab identifications, group identifications, button labels, indications whether the buttons are enabled or disabled, reasons for button disablement, tool tips, and view models. For example, the work tab includes two different group ID's, queued work and connect groups. The queued work group further includes buttons for unlocking queues, searching queues, and viewing the next account in a selected queue. In the illustrated embodiment, the unlock my queues button and the work next button may be currently disabled because a queue is not selected or because the operator may not have permission to access queues. The connect group includes disconnect, hold call, make call, hang up, and transfer call buttons, which may be disabled in the illustrated embodiment because a dialing campaign may not be currently underway. In some cases, the same or similar buttons and groups may be associated with different tabs. For example, the account information tab also includes the work next button and the queue work group of the work tab.

Based on the information in GUI 810, a user of system 800 such as an analysts can use the information to modify the modules to delete repetitive buttons, move buttons or groups to different tabs, enable or disable buttons, relabel buttons, modify the tool tips to include additional descriptions and/or delete unclear descriptions, or redirect some button functions to other view modules.

Endwork Context Viewer

Certain key objects in the system are critical to how the client of the system works. The variable object viewers (e.g., the endwork context viewer described below) provided herein are configured to expose these key objects. Such key objects can be monitored by the object viewers rather than logging key object statuses. For example, if a key object has 1000 lines of code, the value of the code can be provided efficiently and easily at all times via the object viewer rather than undergoing the very tedious and time consuming task of logging off the system and writing logging operations or tracing statement between each line of code and logging back in to obtain the key object status.

Figure 9:
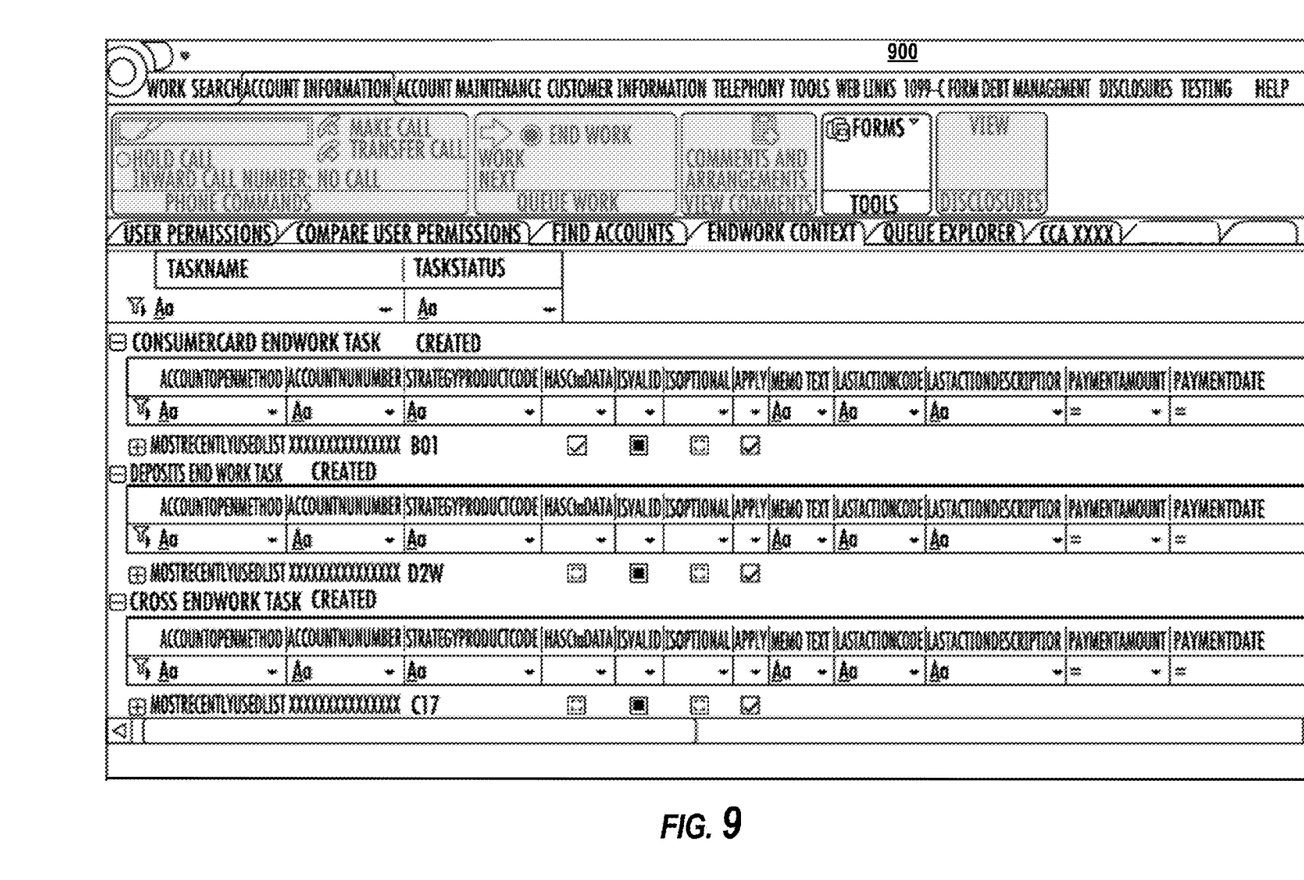
FIG. 9 is an illustration of a screen shot of an endwork context viewer in accordance with various embodiments.

FIG. 9 illustrates a screen shot of an exemplary endwork context viewer 900. Under the Account Information Tab, a tools ribbon is provided. In the illustrated embodiment, the user, via the tools ribbon, selects the endwork context viewer 900. Three account tasks are illustrated in FIG. 9, including a consumer card endwork task, a deposits endwork task, and a cross endwork task. Also provided are task statuses for each account task such as a "created" task status which indicates that the endwork task been created. In other embodiments, the task status may be related to whether task is on hold, cancelled, active, and so forth. Moreover, the lists of accounts tasks may be sorted based on the task name or the task status. In the illustrated example, the account tasks are categorized based on the created task status. Further included for each account task are account open methods, account numbers strategy products codes, whether the task has certain data associated with it, whether the account or status is valid, and other column categories. The user has the option of customizing the viewer by selecting the column category for each column and the order of the column categories.

In additional embodiments, testing features such as tools for viewing user permissions, comparing service operation permissions, and checking account locks are further provided. For example, service operation permissions for source environment, target environments, and applications may be compared.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for integrating production support, the system comprising:
a computer apparatus including a processor and a memory; and
a production support software module stored in the memory, comprising executable instructions that when executed by the processor cause the processor to:
receive a plurality of client modules from a client application associated with an operator device in communication with the system;
initiate recording of events occurring on the client application, wherein the events comprise one or more of: opening windows, requesting data, logging events, updating procedures, opening tools, and archiving;
receive event data associated with the recorded events from the client application;
modify the event data based on display parameters associated with a display of a user device associated with a user;
provide the modified event data to the display of the user device in real time;
alter a workload for the client application;
receive an indication of a failure of the client application from the user via the user device;
identify a first client module of the plurality of client modules, wherein the first client module is associated with the failure of the client application;
identify a trace objective for the first client module, wherein the trace objective includes a reason for tracing the first client module;
determine a data collection level based on the trace objective, wherein the data collection level indicates a type and an amount of data needed to allow the user to test or correct the client module;
collect first client module data of the type and the amount of data indicated by the determined data collection level; and
provide the collected first client module data to the display of the user device.

2. The system of claim 1, wherein the executable instructions further cause the processor to:
select a data output rule; and
provide the collected first client module data to the user device in accordance with the data output rule.

3. The system of claim 2, wherein the executable instructions further cause the processor to:
transmit a mirror display of the operator device to the user device in accordance with a first output rule.

4. The system of claim 3, wherein the executable instructions further cause the processor to:
transmit the collected first client module data to a logging server that is in communication with the system for storage of the collected first client module data in accordance with a second output rule.

5. The system of claim 4, wherein the executable instructions further cause the processor to:
transmit the collected first client module data to the user device in real time in accordance with a third output rule.

6. The system of claim 2, wherein the executable instructions further cause the processor to:
allow the user to identify, test, or correct elements of the first client module based on the collected first client module data.

7. The system of claim 1, wherein the executable instructions further cause the processor to:
identify a second client module of the plurality of client modules, wherein the second client module is associated with the failure of the client application; and
identify a trace objective for the second client module, wherein the trace objective includes a reason for tracing the second module.

8. The system of claim 7, wherein the executable instructions further cause the processor to:
determine a second data collection level based on the trace objective for the second module, wherein the second data collection level indicates a type and an amount of data needed to allow the user to test or correct the client module.

9. The system of claim 8, wherein the executable instructions further cause the processor to:
collect second client module data of the type and the amount of data indicated by the determined second data collection level; and
provide the collected second client module data to the display of the user device.

10. The system of claim 1, wherein the data collection level comprises one or more of: critical data, error data, warning data, informational data, detailed data, and activity tracing data.

11. The system of claim 1, wherein the executable instructions further cause the processor to:
identify code comprising trace recording elements;
transmit the identified code to the client application to enable trace message recording;
receive trace messages from the client application; and
transmit the trace messages to the user.

12. The system of claim 1, wherein the collected first client module data comprises a time stamp of an action performed by the first client module and a description of the action.

* * * * *